March 29, 1966     C. MOSSHART ETAL     3,242,964
INFLATABLE BODY

Filed June 23, 1964     6 Sheets-Sheet 1

INVENTORS
CROCKETT MOSSHART
ROBERT H. SNYDER
BY

ATTORNEY

March 29, 1966  C. MOSSHART ETAL  3,242,964
INFLATABLE BODY

Filed June 23, 1964  6 Sheets-Sheet 2

INVENTORS
CROCKETT MOSSHART
ROBERT H. SNYDER
BY
Harvey E. Bumgardner Jr.
ATTORNEY March 29, 1966
C. MOSSHART ETAL
3,242,964
INFLATABLE BODY
Filed June 23, 1964
6 Sheets-Sheet 3
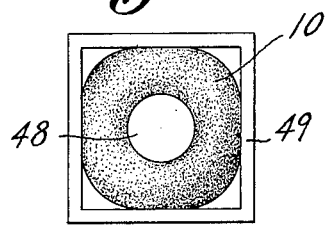
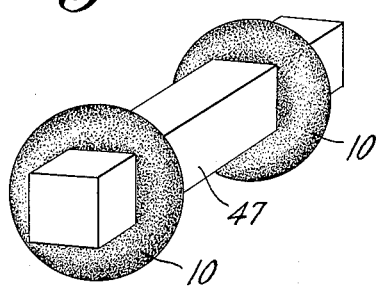
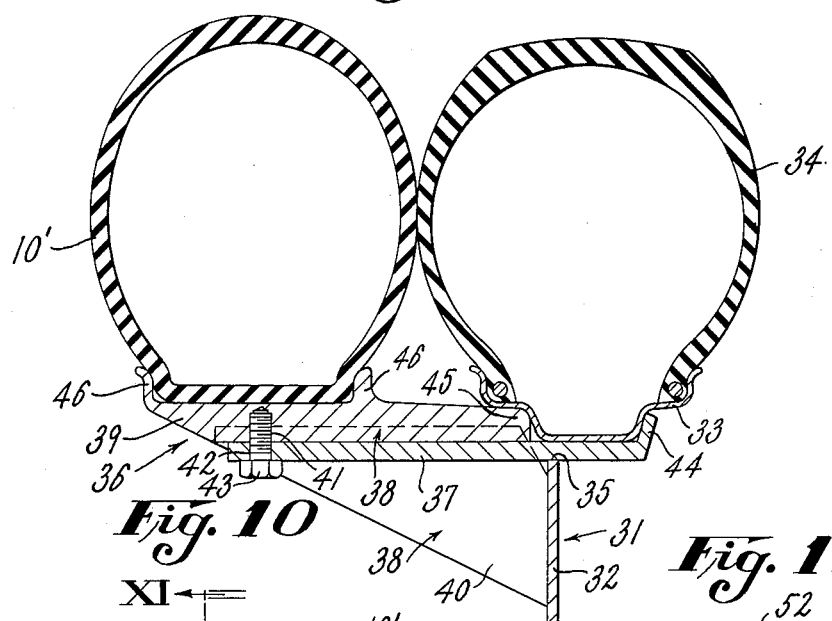
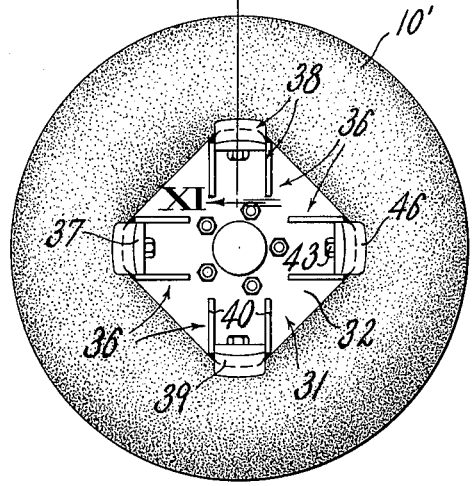
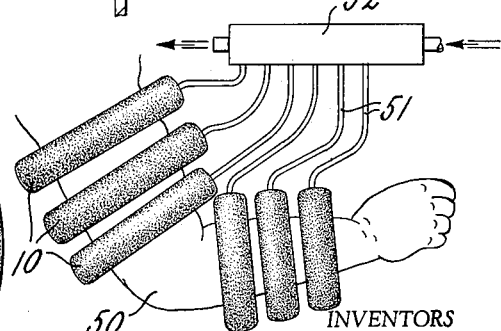
INVENTORS
CROCKETT MOSSHART
ROBERT H. SNYDER
BY
Harvey E. Bumgardner Jr.
ATTORNEY March 29, 1966  C. MOSSHART ETAL  3,242,964
INFLATABLE BODY Filed June 23, 1964  6 Sheets-Sheet 4

INVENTORS
CROCKETT MOSSHART
ROBERT H. SNYDER
BY
Harvey E. Bumgardner Jr
ATTORNEY March 29, 1966  C. MOSSHART ETAL  3,242,964
INFLATABLE BODY Filed June 23, 1964  6 Sheets-Sheet 5

INVENTORS
CROCKETT MOSSHART
ROBERT H. SNYDER
BY
Harvey E Bumgardner Jr
ATTORNEY

March 29, 1966  C. MOSSHART ETAL  3,242,964
INFLATABLE BODY

Filed June 23, 1964  6 Sheets-Sheet 6

INVENTORS
CROCKETT MOSSHART
ROBERT H. SNYDER
BY
Harvey E. Bumgardner Jr
ATTORNEY United States Patent Office 3,242,964
Patented Mar. 29, 1966

1

3,242,964
INFLATABLE BODY
Crockett Mosshart, Detroit, and Robert H. Snyder, Grosse Pointe Park, Mich., assignors to United States Rubber Company, New York, N.Y., a corporation of New Jersey
Filed June 23, 1964, Ser. No. 377,351
16 Claims. (Cl. 152—356)

This invention relates to a toroid shaped inflatable body having many useful applications. More particularly, it relates to such a body which, upon unrestrained inflation, will change very little or increase in outside diameter, and will undergo a substantial reduction in inside diameter all with an accompanying increase in cross-sectional area.

This invention further relates to various useful applications of such an inflatable body, either alone, in combination with other such bodies or in combination with other apparatus, as a vehicle tire, as dunnage, as means for supporting and rolling an irregularly shaped object and as means for exerting a peristaltic effect on a human limb.

With the advent of lower automobiles, the provision and storage of the spare tire has become an increasingly troublesome problem. If the conventional spare tire and wheel are stored, as is usual, in the trunk or luggage space of a passenger automobile, the manufacturer is faced with the problem of placing the spare either at the front or the rear of the luggage compartment. If the spare is placed remote from the opening of the luggage compartment, it is relatively inaccessible when the compartment is loaded. Conversely, if the spare is placed adjacent the opening of the luggage compartment, it interferes in a substantial way with the use of the compartment for luggage or packages. In the modern low vehicle, it is often impossible to mount the spare wheel upright. Also, it is not feasible to mount the spare in or on any other part of the vehicle without creating similar problems. An optimum solution to the problem is not feasible except by doing away with the spare or drastically reducing its volume.

Attempts have been made in the past to eliminate the spare entirely by employing four tires on the road which are equipped with reserve air chambers and, therefore, can be run after the primary air chamber has been punctured. These attempts have generally proved unsatisfactory on two unrelated grounds. First, it has not always been possible for the operator to detect the initial puncture of such a tire. Consequently, there results from continued running the inevitable failure of the reserve air chamber. Second, when such vehicles appear in the second-hand market, potential buyers insist on a spare, resulting in the seller being required to provide a spare wheel and tire for a vehicle which may not have provision for its carriage. The consequence is a financial loss to the seller with no commensurate advantage to the buyer. Most manufacturers of automobiles have, therefore, abandoned such schemes.

Additionally, a drastic reduction in volume of the spare wheel and tire assembly is not possible with a spare of the now conventional type.

In accordance with the present invention, it has been discovered that a suitable emergency tire can be provided at low cost and in a form easily and compactly stored in the automobile, said tire being made and constructed in a manner far different from the manufacture and construction of conventional tires. Such a tire is made in the form of an inflatable, toroid shaped, air retaining body comprised of two, or any even number of uniquely formed plies or layers of substantially inextensible tire cords and at least one layer of air retaining elastomeric material, such as rubber. The body plies may each be constructed by continuously winding a single cord or a plurality of cords in the form of a ribbon on a suitable toroid shaped base with the cord angles of the respective plies of each pair being oppositely disposed with respect to a plane perpendicular to the axis of the toroid and passing through its inside diameter and outside diameter, and all of said cords forming relatively large cord angles with said plane in the region of said outside diameter and relatively small cord angles with said plane in the region of said inside diameter. The resulting tire will have the property of securely gripping the rim of a wheel upon inflation even though it is large enough in inside diameter to be easily slipped over the rim when uninflated.

It has been discovered, for example, that if the cord angle of such a tire is relatively large, say 56° to 60° at the outside diameter or crown region thereof, intermediate, say 55°, in the sidewall regions and relatively small, say 25°–40°, at the inside diameter or rim region thereof, the resulting tire will have the properties of retaining or slightly increasing its outside diameter upon inflation while substantially reducing its inside diameter. If it is desired that the outside diameter substantially increase upon inflation, the cord angles at the outside diameter region may be increased to 70° or 75°.

Similarly constructed inflatable toroid shaped bodies have various useful applications either alone or in combinations with other apparatus. One such application is as dunnage or flexible mountings for various articles. Another is as means for rollably transporting irregularly shaped articles. Still another is as means for exerting a peristaltic effect on the limbs of persons who, for various reasons, may have restricted mobility over considerable periods of time.

Accordingly, it is an object of the present invention to provide a toroid shaped inflatable body of unique construction.

A further object of the invention is to provide a beadless vehicle tire, of unique construction and, more particularly, one which has the property of seating itself on rims of various sizes.

It is a further object of the invention to provide an externally circular shaped article which will firmly grip wheels or other objects of various sizes even if such objects or "wheels" are not round.

It is a still further object of this invention to provide a spare tire and "wheel" for a vehicle which tire can be stored in a small space as by folding.

Still a further object of the invention is to provide a vehicle support system comprising separable wheels, tread members and toroidal shaped treadless "tires" wherein a failed "tire" may be easily replaced without dismounting the wheel on which it was mounted.

Yet another object of the invention is to provide a means for exerting uniform pressure around the external surface of any object for various purposes.

Still another object of the invention is to provide means for exerting a peristaltic effect on human limbs for various purposes.

For a better understanding of the present invention together with other and further objects thereof, reference is had to the following description, taken in connection with the accompanying drawings, and the scope will be pointed out in the appended claims.

In the drawings:

FIG. 8 is an isometric view of the invention employed to support and transport an object.

FIG. 9 is a view of the invention employed as dunnage to centrally support an object in a container.

FIG. 10 is an elevational view of another form of the invention employed as a spare tire for a vehicle.

FIG. 11 is a radial cross-sectional view taken on line XI—XI of FIG. 10.

FIG. 12 is a schematic perspective view showing another form of the invention as practiced for exerting a peristaltic effect on a human arm.

FIGS. 13 through 19, inclusive, are schematic views, partially sectioned, showing sequentially various steps in the construction and curing of one form of the invention.

Figure 18:
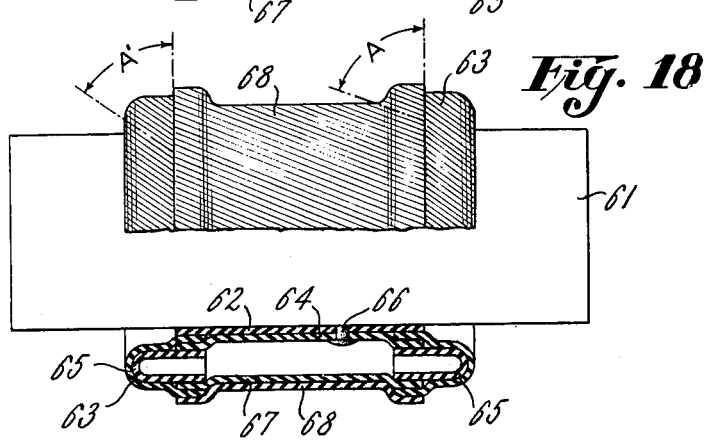
Figure 19:
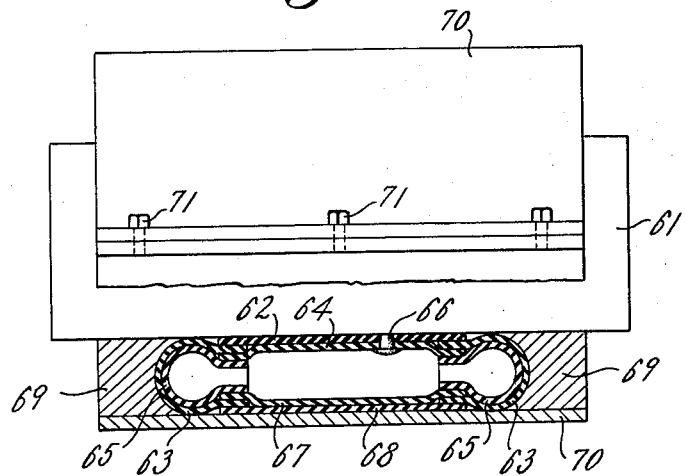
Figure 20:
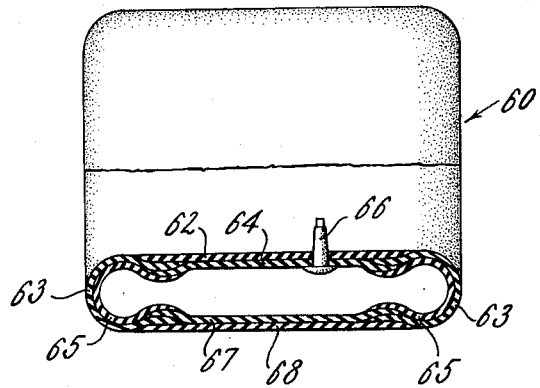

FIG. 20 is a partially sectioned view of the form of the invention resulting from the method of construction illustrated in FIGS. 13 through 19.

Referring now to the drawings, and particularly to FIGS. 1 and 3–6, one basic form of the invention is shown and explained. The basic form of the invention is a toroid shaped inflatable air retaining body 10 comprised of at least one layer of air retaining elastomeric material, in this case a rubber compound liner 11, and at least one pair of layers of relatively inextensible cords, in this case two layers 12 and 13 of cords successively wound continuously about and external to the toroidal liner 11. The cords in the respective plies or layers 12 and 13 are so oriented, relative to a hypothetical plane 14 perpendicular to the axis of the toroid 10 and including the inside diameter 15 and outside diameter 16 thereof, as to form opposite and substantially equal cord angles with said plane 14. Further, the cords of said respective layers 12 and 13 are wound so as to form, with respect to said plane 14, relatively large cord angles at the outside diameter region 17 of the toroid 10 and relatively small cord angles at the inside diameter region 18 of the toroid 10. In the sidewall regions 19 of the toroid 10 the cord angles with respect to a hypothetical plane 20 parallel to the axis of the toroid 10 and tangential to a hypothetical circle included in said sidewall region 19 are intermediate the outside diameter cord angle and inside diameter cord angle.

It should be appreciated that spacing of the cords in the layers 12 and 13 may be varied to suit the requirements of use of the inflatable body 10. These will include the number of plies, load support requirements and the strength of materials used. Similarly additional even numbers of cord plies may be added with the cords of each pair of additional plies similarly oriented to those of the basic plies 12 and 13.

Figure 1:
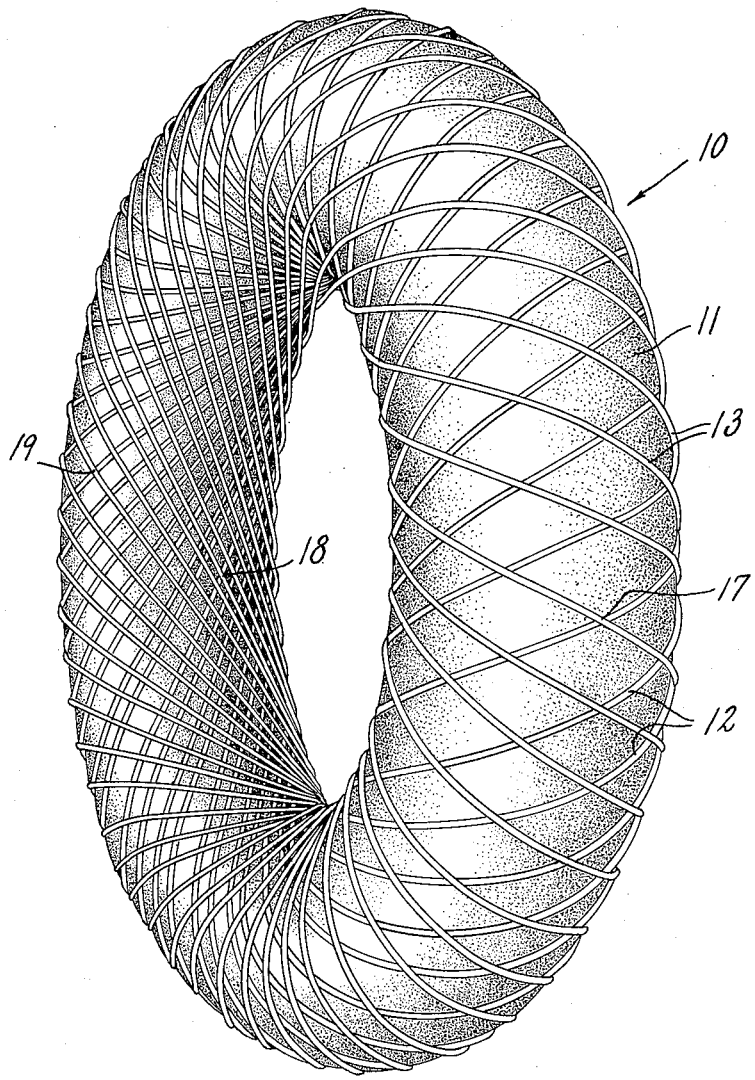
FIG. 1 is a schematic perspective view of one form of the toroidal body of the invention showing two cord layers wound upon an air retaining liner.

Also, in FIG. 1, for purposes of clarity of illustration of the construction of the invention, a single cord winding has been shown for each layer 12 and 13. In actual practice of the invention, tapes comprised of several parallel cords may be used.

Figure 3:
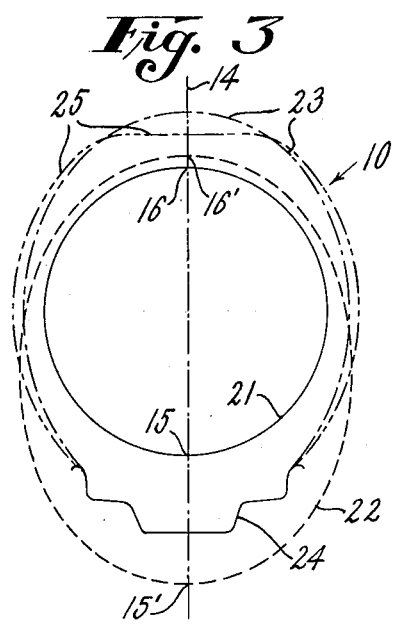
FIG. 3 is a graphic illustration of a radial cross-section of one form of the invention uninflated and inflated under various conditions.
Figure 6:
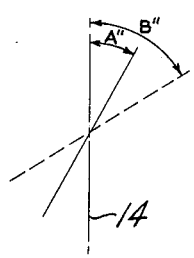

In FIG. 3, the outline of the radial cross-section of a body 10 constructed in accordance with the invention is shown at 21 in relaxed condition being inflated only to atmospheric pressure. Upon unrestrained inflation to operating pressure the body 10 will assume the inflated cross-section shown at 22. It will be observed that, while the outside diameter 16 has increased only slightly to 16', the inside diameter 15 has markedly contracted to 15'. The functional characteristics of the body 10 which result in such inflation characteristics may be best understood by reference to FIGS. 4, 5 and 6 wherein the relaxed cord angles for the outside diameter region 17, sidewall diameter region 19 and inside diameter region 18 of the body 10 are respectively indicated by A, A' and A". Upon inflation to operating pressure, say 24 p.s.i.g., these respective cord angles assume the magnitudes indicated, respectively by B, B' and B". It will be observed, in FIG. 4, that the cord angle A at the outside diameter of the toroid decreases slightly upon inflation to B resulting in a slight lengthening of the outside circumference of the toroid and, hence, a slight growth of the outside diameter of the toroid. Simultaneously, as shown in FIG. 6, the cord angle A" at the inside diameter of the toroid undergoes a marked increase to B" resulting in a marked shortening of the inside circumference of the toroid and a corresponding marked decrease of its inside diameter.

Referring again to FIG. 3, the outline 23 indicates the pattern of expansion of the uninflated toroidal structure 21 when said structure is inflated to an operating pressure of, say 24 p.s.i.g., and restrained internally by seating upon an object such as the vehicle rim 24 schematically outlined and unrestrained at the outside diameter. When the toroidal structure 21 is additionally restrained upon such inflation at the outside diameter, as by a removable tire tread, it will assume an inflated shape such as that indicated at 25.

Figure 2:
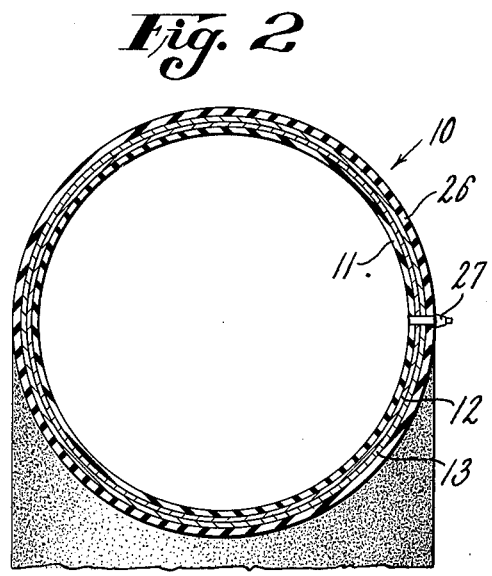
FIG. 2 is a sectional view of another form of the invention taken on a plane including the axis of the toroid.
Figure 4:
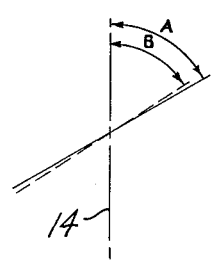
FIGS. 4, 5 and 6 are diagrammatic views showing the cord angle changes upon inflation of the basic form of the invention at the outside diameter, sidewall and inside diameter regions of the toroidal body respectively.
Figure 5:
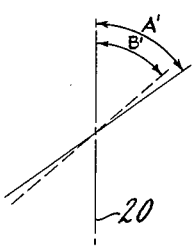

In FIG. 2, a two-ply toroid shaped inflatable body 10 of the characteristics described herein is shown in radial section. As may be seen, the body 10 comprises an air retaining elastomeric lining 11, two layers or plies 12 and 13 of relatively inextensible cords oriented as shown in FIG. 1, and an outer layer 26 of elastomeric material covering the cords. Means 27, which may be in the form of a conventional inner tube valve assembly, are provided for inflating the toroid shaped body 10.

Two examples of the behavior of toroid shaped bodies constructed in accordance with the present invention upon inflation are as follows:

Example I, using a 4.00–8 inner tube as an elastomeric lining.

|  |  |  | Percent Change |
|---|---|---|---|
| Inflation Pressure | 2 p.s.i.g | 13 p.s.i.g |  |
| Outside Diameter | 14.5" | 14.4" | + –.7 |
| Inside Diameter | 7.4" | 5.6" | –23 |
| Cross-section | 3.2" | 3.9" | +22 |
| Cord Angle, O.D | 54° | 58° | +7 |
| Cord Angle, I.D | 25° | 40° | +74 |

Example II, using an 8.00–16 inner tube as an elastomeric lining.

|  |  |  | Percent Change |
|---|---|---|---|
| Inflation Pressure | 3 p.s.i.g | 24 p.s.i.g |  |
| Outside Diameter | 29.0" | 29.6" | +1.02 |
| Inside Diameter | 16.0" | 10.0" | –26.6 |
| Cross-Section | 6.5" | 7.7" | +5.4 |
| Cord Angle, O.D | 60° | 58° | –3 |
| Cord Angle, I.D | 30° | 60° | +100 |

It has been found that, if the cord angle in the outside diameter region is increased substantially beyond the range 54°–60°, the outside diameter of the toroid will increase upon inflation. For example, a toroid with an O.D. cord angle of 75° may expand as much as 30% in outside diameter upon inflation. Similarly, when the I.D. cord angle is 40° or less the inside diameter of the toroid will substantially decrease upon inflation. In addition to being dependent upon the respective cord angles, the changes in the inside diameter and outside diameter of the toroid upon inflation is also dependent upon the ratio of the uninflated inside and outside diameters.

The manufacture of the toroid shaped body which is the subject of this invention may be accomplished by winding single cords or tapelike strips made up of several parallel cords around a suitable toroidal base or form which, if it is desired to remove said form without cutting and patching the wound body, may be any of the well known types of disappearing mandrels such as wax, low melting temperature alloys or soluble plastics. The form may, before winding, be covered with a layer of uncured, fully compounded tire carcass stock to provide an air impervious inflatable lining. The cords may, before winding, be elastomer coated as by solution or dipping. These cords should be relatively inextensible and may be of rayon, nylon, polyester fiber or any suitable material such as steel. The extent of winding is determined by the ply rating desired in the finished toroidal body, which is a function of the cord strength, ends per inch and number of wraps.

As an alternative method of manufacture, a durable toroidal mandrel may be used, and the body constructed thereon may be removed by slitting it around the inside diameter circumference. After removal of the body from the mandrel, the severed edges may be lapped together or butt joined with a suitable "patch."

The winding may be done by hand or by a suitably modified tire wrapping machine. Apparatus for accomplishing such winding may be basically similar to that disclosed in U.S. Patents Nos. 626,998; 991,458; 1,184,328; and 1,319,695. The apparatus will differ from those disclosed in that the angles of winding chosen for the inflatable body of the present invention differ from those previously used and in that these angles are not constant throughout one revolution of the winding device, but must be controllably varied within wide limits at the will of the operator. It will be necessary to modify the drive rate of the winding spool during one revolution and/or that of the winding form to obtain the varying cord angles desired. It will be found that the slower the relative rate of drive of the winding spool around the cross-section of the form, the lower will be the resulting cord angle.

Referring now particularly to FIGS. 13-20, an alternative form of the invention and its method of construction are shown. In this alternative form of the invention 60, the toroid shaped inflatable body may be constructed from a plurality of bias cut pieces of rubber coated "weftless" tire cord fabric of the type commonly used in the construction of ordinary tire carcasses.

Figure 13:
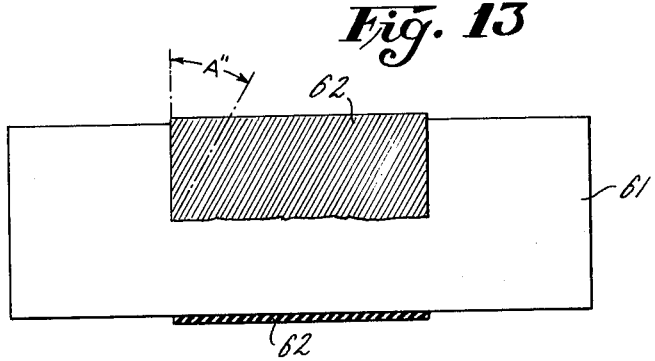

In FIG. 13, a conventional building drum 61, such as is employed in the tire building art, is shown with the first or inner ply 62 of fabric applied thereto and spliced to form a continuous cylindrical pocket. It will be noted that this inner ply 62 will be bias cut and applied to form a relatively small cord angle A″ with respect to a plane perpendicular to the axis of the drum 61 corresponding with the desired cord angle at the inside diameter region of the finished toroidal body 60.

Figure 14:
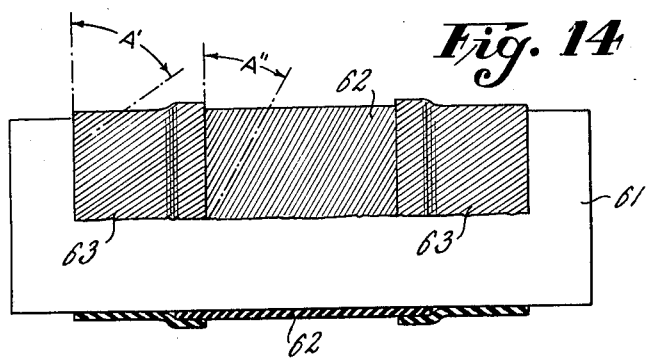

In FIG. 14, a first pair of bias cut sidewall plies 63 are shown applied to the drum 61 and spliced to form continuous pockets and overlapping and stitched to the respective edges of the first inside diameter ply 62. It will be noted that the cord angles A′ of the first sidewall plies 63 are greater than the cord angle A″ of the first inside diameter ply 62 and, as will be shown hereinafter, are intermediate the cord angles A″ and A of the inside diameter plies and outside diameter plies respectively.

Figure 15:
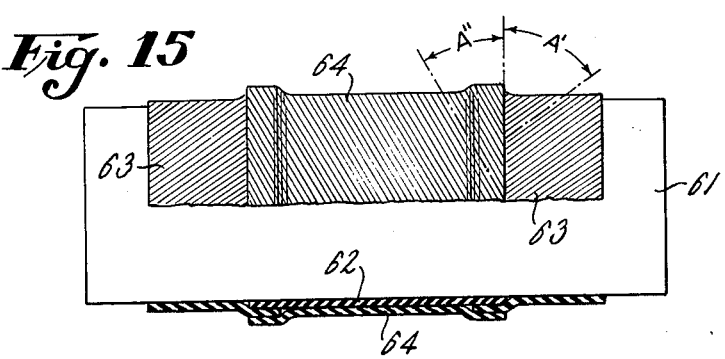

In FIG. 15, a second bias cut inside diameter ply 64, having a cord angle A″ substantially equal and opposite to the cord angle A″ of the first inside diameter ply 62, is shown applied and spliced to form a continuous pocket over the first inside diameter ply 62 with its edges overlapping the edges of the first sidewall plies 63.

Figure 16:
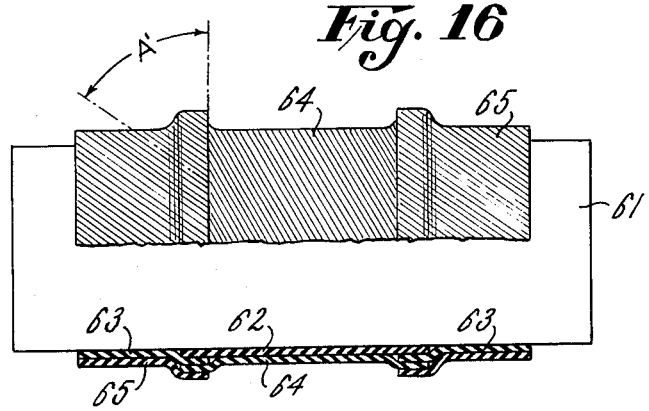

In FIG. 16, a second pair of bias cut sidewall plies 65 are applied and spliced over the first sidewall plies 63 and overlapping the edges of the second inside diameter ply 64. The cord angles A′ of the second sidewall plies 65 are substantially equal and opposite to the cord angles A′ of the first pair of sidewall plies. It may be necessary to insert non-tacky "pull strips" (not shown) between the first and second sidewall plies to prevent their adhering together so as to facilitate turning them up one at a time in subsequent steps. Also, at this point in the building process, the entire exposed surface of the partially built inflatable body 60 will be dusted with a suitable lubricant or non-adhesive such as mica or talc.

Figure 17:
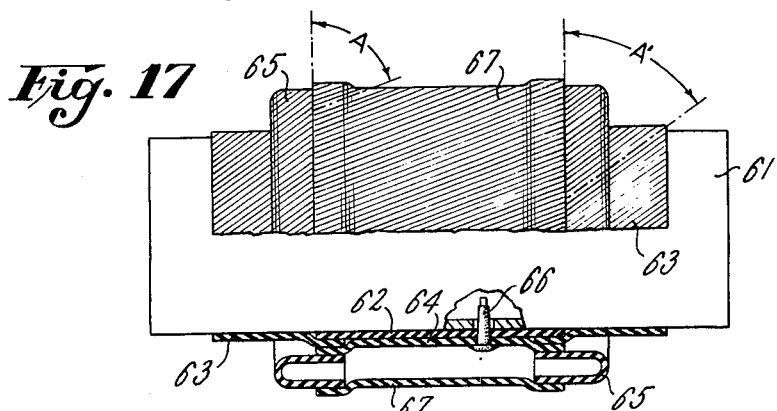

FIG. 17, depicts the body 60 after three additional building steps. First, a hole was punched with an awl through the inside diameter plies 62 and 64 at a location corresponding to a suitably sized hole in the building drum 61, and a valve assembly 66 was inserted therein and cemented down. Then the second sidewall plies 65 were turned up exposing the tacky under-surfaces thereof. Next, the first outside diameter ply 67 was applied so that its edges overlapped and were stitched to the edges of the turned up second sidewall plies 65. The cord angle A of the first outside diameter ply 67 is even greater than that of the sidewall plies 63 and 65.

In FIG. 18, the first sidewall plies 63 have been turned up over the second sidewall plies 65 and lapped over and adhered to the edges of the first outside diameter ply 67. Thereafter, the second outside diameter ply 68, having a cord angle A substantially equal and opposite to that of the first outside diameter ply 67, has been applied over the first outside diameter ply 67 with its edges overlapping the edges of the first sidewall plies 63. If desired, a layer of tread rubber compound (not shown) may be applied at this point.

In FIG. 19 the inflatable body 60 is shown prepared for curing. While the body 60 is still on the drum 61, suitably shaped ring members 69 are slipped over each end of the drum 61 to abut the body 60. Next, a split shell 70 is joined and drawn tight about the body 60 and rings 69 by means of the bolts 71. If tread stock has been provided on the body 60 this split shell may be provided with a tread mold on its inside surface. Finally the body 60 is pressurized with nitrogen and cured in an autoclave. The finished and cured body 60 is shown in FIG. 20 stripped from the drum 61.

In practice, it has been found that best results are obtained when the respective sidewall plies are applied with the cord angles oriented in the same general direction as the cord angle of the inside diameter ply over which each pair of sidewall plies are lapped and a similar practice is believed desirable when applying the outside diameter plies over the sidewall plies. In this manner cord angle discontinuities at the ply splice areas are minimized and a continuously wound structure is simulated.

Also in practice, the first and second plies in any region of the body 60 may not be cut to exactly the same width and, theoretically, a slight change in cord angle between adjacent first and second plies is desirable to compensate for the slightly different diameters on which they are laid up.

A typical body 60 of this form of the invention may be constructed with a 30° inside diameter cord angle, a 55° sidewall cord angle and a 70° outside diameter cord angle.

It will be noted that, particularly, with such bodies 60 of small cross section, the sidewall plies may be omitted. Conversely, especially with such bodies of large cross section two lapped plies with graduated cord angles could be substituted for each sidewall ply.

Figure 7:
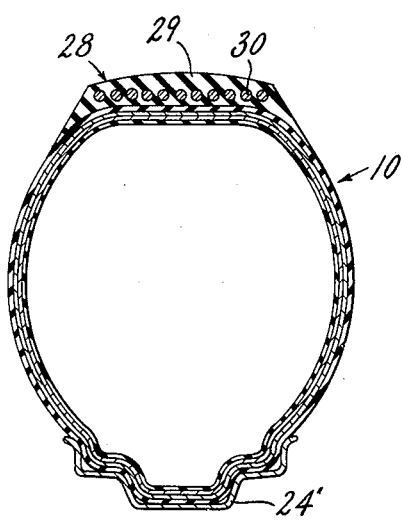
FIG. 7 is a radial cross-sectional view of another form of the invention employed as a vehicle tire.

The toroid shaped inflatable body which is the subject of this invention has many useful applications either alone or in cooperation with other such bodies and with other apparatus. In FIG. 7, for example, such a body 10 is shown applied to a rim 24′ in conjunction with a separable tread element 28 as a vehicle tire. The separable tread element 28 is comprised of an appropriately shaped circumferential band 29 of tread rubber having an inwardly concave or other suitable radial cross-section. Embedded in the tread rubber band 29 in the crown region and/or shoulder region thereof and integrally bonded therewith are one or more circumferentially disposed fabric breaker plies 30. If separability of tread is not desired, the tread element 28 may be bonded to the carcass 10.

Inflatable bodies 10 of the type described herein have been found to have a very great advantage over standard carcasses as a base for detachable tread members 28, resulting in a system whereby it is possible to equip a motor vehicle with a total of five tire carcasses 10 and four detachable treads 28, in other words, four complete tires and one spare carcass. The fifth carcass can be folded into a very small package for storage at any convenient place in the vehicle with, preferably, a small cylinder of compressed gas for inflation when needed. The size and pressure of the cylinder can be readily adjusted to provide correct inflation pressure without the necessity of a gauge. It may be desirable to evacuate the spare carcass of air in order to facilitate folding to the smallest possible "package."

Because a detachable tread member 28 must contain a substantially inextensible belt structure or breaker 30 to prevent it from becoming detached in use, the tread circumference does not change in use. A tire in use, however, is flexed at the road surface. This results, in the usual detachable tread tire, in scuffing between the carcass and the tread because the chord of the arc represented by the flattened portion of the tread being shorter than the arc subtended thereby in the unflexed tire, results in a loosening of the tread around the rest of the tire. A tire with a standard carcass does not, when flexed, increase in circumference. A tire carcass constructed in accordance with the present invention and having an outside diameter or crown cord angle over 54–58° and a rim cord angle in the range of 25°–40° will, however, tightly grip the wheel rim and, at the same time, respond to the loosening of the tread caused by flexing by growing to a larger diameter. The result is that the loosening of the tread is nullified, and the usual scuffing between tread and carcass does not occur.

It will be seen, from FIGS. 10 and 11 particularly that the inflatable body 10 of this invention may also be usefully applied, in conjunction with suitable dismountable rim segments as a crutch type spare tire. In the typical example illustrated, a conventional vehicle wheel 31 having a web or flange portion 32 and a rim 33 is shown mounted with a conventional tire 34 which may be presumed to have failed by puncture or otherwise. The flange 32 of the wheel 31 is provided with four equally circumferentially spaced openings 35 adjacent to the rim 33.

Upon tire failure, the failed tire 34 may be left mounted on the rim 33. To mount the spare four adapter lug assemblies 36 are first mounted in equally circumferentially spaced relationship on the wheel 31. Each such adapter lug assembly is constructed and mounted in the following manner. An extension member 37 is slipped through an opening 35 in the wheel flange 32 from the inside of the wheel 31 to seat against the rim 33. Next a rigid member 38 comprised of a rim segment member 39 to which are rigidly attached two side braces 40 is slipped over the extension member 37 into seating engagement with the rim 33 and flange 32 of the wheel 31, bringing the threaded hole 41 in the rim segment member 39 into registry with the hole 42 in the extension member 37. The extension member 37 and the rim segment member 39 are then fastened together by means of the bolt 43 to complete the adapter assembly 36. The coaction of the lip 44 of the extension member 37 and the heel 45 of the rim segment member 39 against the rim 33 and of the side braces 40 against the flange 32 properly secure the lug assemblies 36 to the wheel 31. The wheel segment member 39 is provided with a radially outwardly concave cross-section defined by the rim flanges 46 for seating the inflatable toroid shaped body 10 to function as a spare tire. The body 10' will be large enough in inside diameter to be easily slipped over the rim flanges 46 when uninflated and will expand radially inward upon inflation to firmly seat upon the rim segment members 39.

If the toroid shaped body 10 of the present invention is to be used as a spare tire 10', it can be provided with a very thin and flexible tread to facilitate folding and storage. The absence of bead wires also greatly facilitates both storage and mounting. If the cord angle is kept to the range 54°–60° in the crown or O.D. region of the tire 10' and reduced to 25°–40° at the rim or I.D. region, the resulting tire 10' will, upon inflation, substantially contract in inside diameter while maintaining a relatively unchanged outside diameter. It has been found that such a tire 10' made with a 16" uninflated inside diameter can be fitted to 13", 14" or 15" rims whether or not segmented, thus providing a spare tire suitable for a wide range of automobiles. The spare tire 10' of the present invention can be made in very light strong form by casting, dipping, or painting liquid polyurethane about the wound cords on the base to form the carcass and curing in the usual way for polyurethane.

In FIG. 8 the toroid shaped body 10 of the invention is shown applied to the rolling transport of a long rectangular object 47 such as a beam. One such body 10 is simply slipped uninflated over each end of the beam 47 and the bodies 10 are then inflated to grip the beam 47 whereupon it may be easily rolled.

FIG. 9 illustrates the application of the body 10 of this invention to centrally support an object 48, such as a cylinder, missile, projectile or the like, in a centrally located air cushioned manner within a packing case 49.

A further application of the inflatable toroid shaped body 10 of this invention in combination with other such bodies 10 and additional apparatus is illustrated in FIG. 12. Space vehicle crews, persons with spinal injuries and others who must remain relatively immobile for long periods of time may suffer fatigue or poor circulation in one or more of their limbs as the result of such relative immobility. To combat such effects, the individual enduring the same may be provided with clothing incorporating a series of the toroid shaped bodies 10 of this invention in the following manner. A series of inflatable toroid shaped bodies 10 of this invention are especially constructed to fit loosely in uninflated condition over the human limb to be subjected to a peristaltic effect at predetermined intervals with respect thereto. Since the bodies 10 have the property of substantial radially inward contraction of their respective inside diameters the fit need not be exact, although a series of said bodies designed to fit the individual limb in the desired positions will result in a more even application of pressure thereto. The cord angles of said respective bodies 10 will preferably be from 54° to 58° in the outside diameter region and from 25° to 40° at the inside diameter. These bodies 10 will normally be attached to the interior surface of a garment (not shown) such as a space suit to retain the predetermined positions thereof with respect to the limb 50, illustrated as an arm. Each of said toroidal bodies 10 is connected, by means of suitable pneumatic conduits 51, to a sequential pneumatic control valve 52, such as one known as an Imperial Shut Off Valve and manufactured by Imperial Brass Manufacturing Company of Chicago, Illinois. By operation of such a valve 52 the toroidal bodies 10 are caused to sequentially inflate and deflate whereby their respective inside diameter regions sequentially contract inwardly to contact, compress and exert a beneficial peristaltic effect upon the limb 50.

While the preferred form and several applications of this invention have been described herein more or less in detail, it will be understood that changes therein may be made without departing from the spirit of the invention or the scope of the appended claims.

Having thus described our invention, what we claim and desire to protect by Letters Patent is:

1. A toroid shaped inflatable body comprising: an even number of layers of relatively inextensible cords; the cord angles of half of said cord layers, with respect to a plane perpendicular to the axis of said toroid and passing through the inside and outside diameters thereof, being opposite to the cord angles of the other half of said layers; the cord angles of all said layers being from 45° to 75° in the region of the outside diameter of said toroid and from 25° to 40° in the region of the inside diameter of said toroid; and at least one continuous layer of air retaining elastomeric material.

2. A toroid shaped inflatable body comprising: two layers of relatively inextensible cords; the cord angles of said respective layers, with respect to a plane perpendicular to the axis of said toroid and passing through the inside and outside diameters thereof, being opposite and substantially equal at any point on the surface of the toroid; the cord angles of both said layers being from 45° to 75° in the region of the outside diameter of said toroid and from 25° to 40° in the region of the inside diameter of said toroid; and at least one continuous layer of air retaining elastomeric material.

3. The article of claim 2 wherein at least one additional pair of cord layers having opposite cord angles are included therein, the cord angles of said additional layers being also from 45° to 75° in the region of the outside diameter of said toroid and from 25° to 40° in the region of the inside diameter of said toroid.

4. The article of claim 1 wherein each said cord layer is comprised of continuously wound cords.

5. The article of claim 2 wherein each said cord layer is comprised of continuously wound cords.

6. The article of claim 3 wherein each said cord layer is comprised of continuously wound cords.

7. A toroid shaped inflatable body comprising: an air retaining elastomeric liner; an even number of layers of relatively inextensible cords superimposed thereon; and an outer layer of elastomeric material covering said cords; the cord angles of half of said cord layers, with respect to a plane passing perpendicular to the axis of the toroid through the inside and outside diameters thereof, being opposite to the cord angles of the other half of said layers; the cord angles of all said layers being from 45° to 75° in the region of the outside diameter of the toroid and from 25° to 40° in the region of the inside diameter of the toroid.

8. A toroid shaped inflatable body comprising: an air retaining elastomeric liner; two layers of relatively inextensible cords superimposed thereon; and an outer layer of elastomeric material covering said cords; the cord angles of said respective cord layers, with respect to a plane perpendicular to the axis of said toroid in passing through the inside and outside diameters thereof, being opposite and substantially equal at any point on the surface of the toroid; the cord angles of both said layers being from 45° to 75° in the region of the outside diameter of said toroid and from 25° to 40° in the region of the inside diameter of said toroid; said elastomeric liner, said cord layers and said outer elastomeric layer being bonded together in an integral structure.

9. The article of claim 8 wherein at least one additional pair of cord layers having opposite cord angles are included therein, the cord angles of said additional layers being also from 45° to 75° in the region of the outside diameter of said toroid and from 25° to 40° in the region of the inside diameter of said toroid.

10. A vehicle wheel comprising: a rim having a radially outwardly concave cross-section; a circumferentially inextensible tread member having an inwardly concave cross-section, and having a minimum inside diameter larger than the maximum outside diameter of said rim, a toroid shaped inflatable body including an even number of layers of relatively inextensible cords, the cord angles of half of said cord layers, with respect to a plane passing perpendicular to the axis of the toroid through the inside and outside diameters thereof, being opposite to the cord angles of the other half of said layers, the cord angles of all said layers being from 54° to 75° in the region of the outside diameter of the toroid and from 25° to 40° in the region of the inside diameter of the toroid; said toroid shaped body being inflatable to expand the outside diameter thereof to grip said tread member and to contract the inside diameter thereof substantially inwardly to seat upon said rim; said toroid shaped body, when inflated, holding said tread member in uniformly radially spaced relationship to said rim around the entire circumference thereof.

11. A vehicle support system for a vehicle having at least two axles including: four identical wheel members, one of said wheel members being mounted on each end of each axle, each said wheel member provided with a rim having radially outwardly concave cross-section; four identical circumferentially inextensible tread members, each having a minimum inside diameter larger than the maximum outside diameter of said rims, each said tread member having a radially inwardly concave cross-section; and five identical toroid shaped inflatable bodies, each said inflatable toroid shaped body comprising an even number of layers of relatively inextensible cords, the cord angles of half of said cord layers, with respect to a plane passing perpendicular to the axis of the toroid through the inside and outside diameters thereof, being opposite to the cord angles of the other half of said layers, the cord angles of all said layers being from 54° to 75° in the region of the outside diameter of the toroid and from 25° to 40° in the region of the inside diameter of the toroid, each said toroid shaped body being inflatable to expand the outside diameter thereof to grip one of said tread members and to contract the inside diameter thereof inwardly to seat upon the rim of one of said wheel members, each of four of said toroid shaped bodies, when inflated, holding one of said tread members in uniformly radially spaced relationship to one of said rims around the entire circumference thereof, whereby any said toroid shaped body which becomes deflated may be replaced without dismounting a wheel member.

12. Apparatus for centrally supporting an object within a container including at least one toroid shaped inflatable body comprising an even number of layers of relatively inextensible cords; the cord angles of half of said cord layers, with respect to a plane passing perpendicular to the axis of said toroid through the inside and outside diameters thereof, being opposite to the cord angles of the other half of said cord layers; the cord angles of all of said cord layers being from 54° to 75° in the region of the outside diameter of said toroid and from 25° to 40° in the region of the inside diameter of the toroid; each said toroid shaped body being of such dimensions as, upon inflation, to expand outwardly to contact substantial portions of said container and to contract inwardly, at the inside diameter thereof, to grip said object.

13. Means for supporting and rolling an object of irregular cross-section including at least one toroid shaped inflatable body comprising: an even number of layers of relatively inextensible cords; the cord angles of half of said cord layers, with respect to a plane passing perpendicular to the axis of the toroid through the inside and outside diameters thereof, being opposite to the cord angles of the other half of said cord layers; the cord angles of all said cord layers being from 45° to 75° in the region of the outside diameter of the toroid and from 25° to 40° in the region of the inside diameter of the toroid; the inside diameter of said toroid being inwardly contractable upon inflation to grip and conform to the shape of the object to be supported and rolled.

14. A spare tire for a vehicle wheel and means for the operational mounting thereof comprising, in combination: a plurality of members mountable on said wheel to extend substantially parallel to the axis of said wheel outwardly thereof with respect to said vehicle; the radially outward portions of said members when so mounted defining segments of an outwardly concave wheel rim; a toroid shaped inflatable body including an even number of layers of relatively inextensible cords, the cord angles of half of said cord layers, with respect to a plane passing perpendicular to the axis of the toroid through the inside and outside diameters thereof, being opposite to the cord angles of the other half of said layers, the cord angles of all of said layers being from 54° to 75° in the region of the outside diameter of the toroid and from 25° to 40° in the region of the inside diameter of the toroid, said toroid shaped inflatable body being expansible, upon inflation, to an outside diameter at least as great as the inflated outside diameter of the tire to be spared and being inwardly contractable, upon inflation, at the inside diameter thereof, to grip said rim segments.

15. Apparatus for exerting a peristaltic action upon a human limb comprising, in combination; a plurality of toroid shaped inflatable bodies suitably sized to fit loosely over said limb at predetermined intervals, each said body having an inside diameter and an outside diameter, each said toroid shaped body including an even number of layers of relatively inextensible cords, the cord angles of half of said layers, with respect to a plane passing perpendicular to the axis of the toroid through the inside and outside diameters thereof, being opposite to the cord angles of the other half of said layers, the cord angles of all of said layers being from 54° to 60° in the region of the outside diameter of the toroid and from 25° to 40° in the region of the inside diameter of the toroid, each of said bodies, upon unrestrained inflation, being capable of undergoing a substantial contraction of its inside diameter with little or no accompanying change in its outside diameter; and means for sequentially inflating and deflating said inflatable bodies to exert a peristaltic effect on said limb.

16. The apparatus of claim 15 further comprising means to position said inflatable bodies to surround said limb at preestablished intervals.

References Cited by the Examiner
UNITED STATES PATENTS

| | | | |
|---|---|---|---|
| 1,297,279 | 3/1919 | Wayne | 152—350 |
| 1,643,379 | 9/1927 | Hutchinson | 301—39 |
| 2,523,880 | 9/1950 | Schoenfielder. | |
| 2,531,074 | 11/1950 | Miller | 128—38 |
| 2,906,314 | 9/1959 | Trevaskis | 152—356 |
| 3,044,608 | 7/1962 | Bachleder et al. | 206—46 |

ARTHUR L. LA POINT, *Primary Examiner.*

C. W. HAEFELE, *Assistant Examiner.*